United States Patent
Hayashi et al.

(10) Patent No.: US 8,282,054 B2
(45) Date of Patent: Oct. 9, 2012

(54) STAND FOR PORTABLE ELECTRONIC DEVICE

(75) Inventors: Toyofumi Hayashi, Hamamatsu (JP); Kenshiro Tanaka, Sayama (JP)

(73) Assignee: Yamaha Corporation, Hamamatsu-shi (JP)

( * ) Notice: Subject to any disclaimer, the term of this patent is extended or adjusted under 35 U.S.C. 154(b) by 340 days.

(21) Appl. No.: 12/548,069

(22) Filed: Aug. 26, 2009

(65) Prior Publication Data

US 2010/0051764 A1 Mar. 4, 2010

(30) Foreign Application Priority Data

Aug. 28, 2008 (JP) ................. 2008-220521

(51) Int. Cl.
*F16M 11/00* (2006.01)
(52) U.S. Cl. ................. 248/176.1; 248/346.01
(58) Field of Classification Search ............... 248/176.1, 248/146, 158, 151, 648, 346.01
See application file for complete search history.

(56) References Cited

U.S. PATENT DOCUMENTS

| 2,671,628 | A * | 3/1954 | Everhard | 248/151 |
| 5,301,909 | A * | 4/1994 | Chang | 248/146 |
| 6,361,001 | B1 * | 3/2002 | Durand | 248/146 |
| 2006/0006294 | A1 * | 1/2006 | Harris | 248/146 |
| 2010/0108830 | A1 * | 5/2010 | Wang et al. | 248/158 |

FOREIGN PATENT DOCUMENTS

JP 2006-262326 A 9/2006

\* cited by examiner

*Primary Examiner* — Ramon Ramirez
(74) *Attorney, Agent, or Firm* — Cowell & Moring LLP (57) ABSTRACT

A stand for a portable electronic device includes: an annularly-formed stand body having a first end face and a second end face apart from each other in a direction vertical to a face forming an annular circle of the stand body, the stand body holding therein the portable electronic device to be inserted from a side of the first end face; and a leg portion having side surfaces projected radially outside the stand body so as to reduce the width dimension between the side surfaces. A grounding surface of the stand to be grounded when the stand is mounted is selected from the second end face of the stand body and one of the side surfaces of the leg portion.

7 Claims, 7 Drawing Sheets

STAND FOR PORTABLE ELECTRONIC DEVICE

BACKGROUND OF THE INVENTION

1. Technical Field

The present invention relates to a stand for portable electronic device for installing therein, for example, a mobile phone, a portable music player, or the like in a horizontally mounted state or a vertically mounted state.

2. Background Art

Cradles on which portable electronic devices are placed for charging secondary batteries contained in the portable electronic devices and performing transmission and reception of data into and from memories equipped in the portable electronic devices have been known.

Portable electronic devices are often provided with display portions, and some of the portable electronic devices, in a placed state, automatically switch over a vertically long display and a horizontally long display. Therefore, there has been provided a placing base for an electronic device on which an electronic device is installed in a vertically mounted state and a horizontally mounted state (JP2006-262326A).

Here, the placing base described in JP2006-262326A has a substantially triangular first base part that serves as a base for a mobile phone in a vertically mounted state, and a second base part that is connected to the first base part and serves as a base for a mobile phone in a horizontally mounted state.

SUMMARY OF THE INVENTION

It is an object of the present invention to provide a stand for portable electronic device capable of supporting a portable electronic device in a vertically mounted state or a horizontally mounted state.

According to an aspect of the invention, there is provided a stand for a portable electronic device, the stand including: an annularly-formed stand body having a first end face and a second end face apart from each other in a direction vertical to a face forming an annular circle of the stand body, the stand body holding therein the portable electronic device to be inserted from a side of the first end face; and a leg portion having side surfaces projected radially outside the stand body so as to reduce the width dimension between the side surfaces, wherein a grounding surface of the stand to be grounded when the stand is mounted is selected from the second end face of the stand body and one of the side surfaces of the leg portion.

Further, a guide groove may be formed on an inner surface of the stand body from the first end face toward the second end face to insert a part of the portable electronic device.

Further, the guide groove may be inclined with respect to a center axis of the annular circle of the stand body.

Further, the stand body may be substantially equal in diameter to a width dimension of the portable electronic device.

Further, a feeding terminal may be provided on the stand body to be connected to a receiving terminal of the portable electronic device.

Further, a holder for holding the portable electronic device may be detachably provided to the stand body.

Further, the side surfaces of the leg portion may be formed in tapered and tangential to a side surface of the stand body.

In the stand for portable electronic device according to the present invention, by grounding the first grounding surface (the second end face of the stand body), for example, a portable electronic device is installed in a vertically mounted state, and by grounding the second grounding surface (the side surface of the leg portion), for example, a portable electronic device is installed in a horizontally mounted state. Moreover, the stand for portable electronic device also has a simple structure in terms of design constituted by the annular stand body and the leg portion formed in a projecting manner radially outside the same, so that the size can be reduced.

DETAILED DESCRIPTION OF THE PREFERRED EMBODIMENTS

Hereinafter, an embodiment of a cradle including a stand for portable electronic device according to the present invention will be described.

<General Construction of Cradle>

Figure 1:
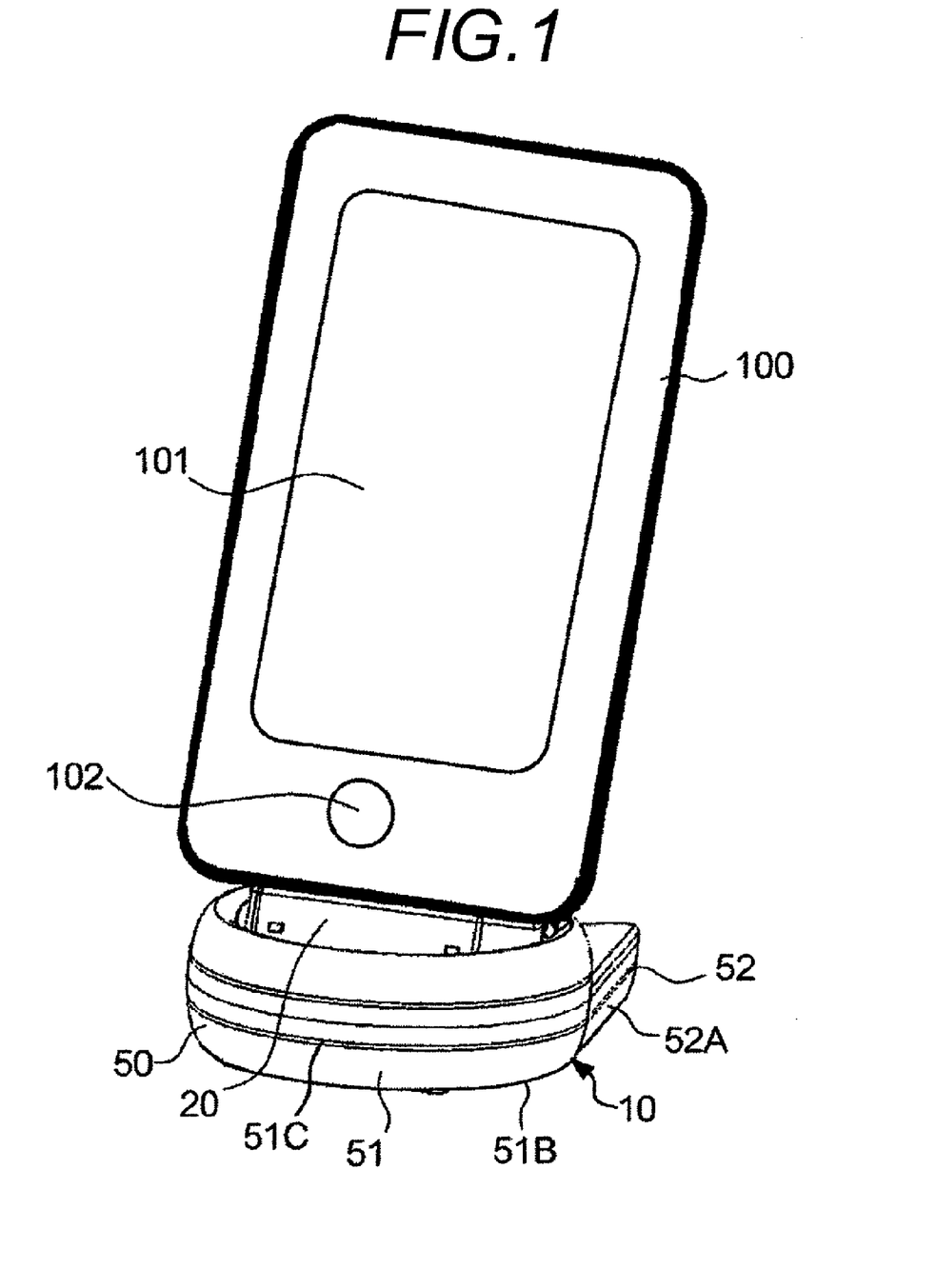
FIG. 1 is a perspective view showing a state where a portable electronic device is placed on a cradle according to an embodiment of the invention.
Figure 2:
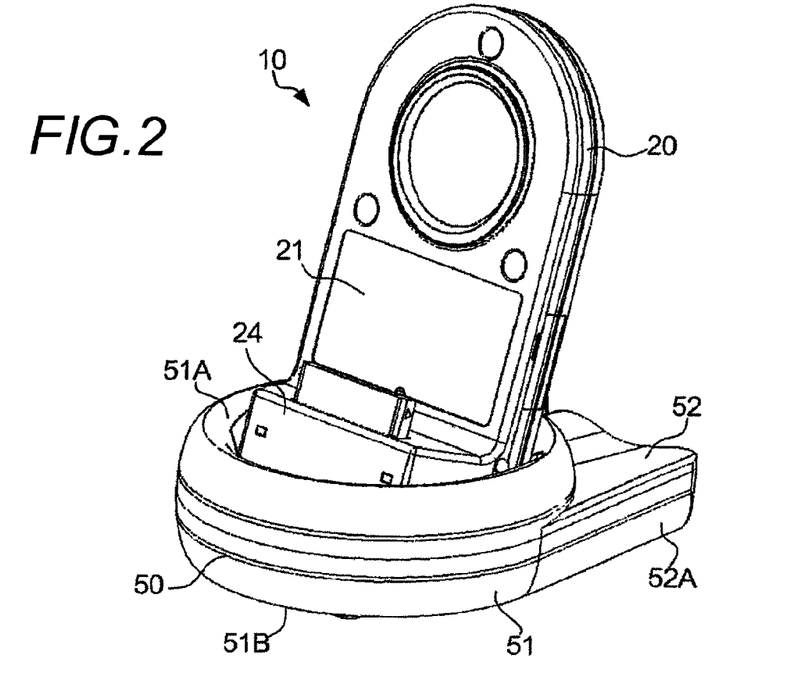
FIG. 2 is a perspective view showing the cradle according to the embodiment.

FIG. 1 is a perspective view showing a state where a portable electronic device is placed on the cradle 10 according to the present embodiment, and FIG. 2 is a perspective view showing the cradle 10 according to the embodiment. In the embodiment, description will be given on the assumption that a portable music player 100 (hereinafter, referred to as a "player 100") is placed as a portable electronic device on the cradle 10.

Figure 8:
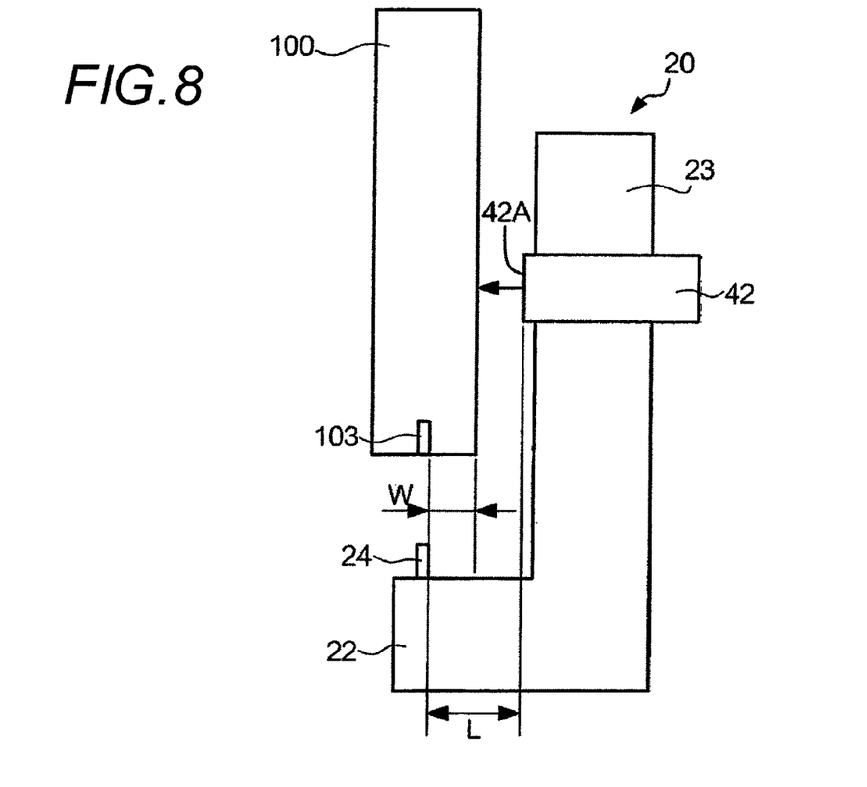
FIG. 8 schematically shows a dimensional relationship between the holder and the portable electronic device.

As shown in FIG. 1 and FIG. 2, the cradle 10 includes a holder 20 on which the player 100 is placed and a stand for portable electronic device 50 (hereinafter, referred to as a "stand 50") that supports the holder 20 in a vertically mounted and horizontally mounted states. The player 100 is formed in a rectangular plate shape as its external shape, arranged on the surface with a touch panel-type display portion 101 and a manipulator 102, and provided with an device-side connector 103 (shown in FIG. 8. FIG. 8 is a view from the thickness direction) in the central portion of the short side and in the central portion in the thickness direction.

<Construction of Holder 20>

Figure 3:
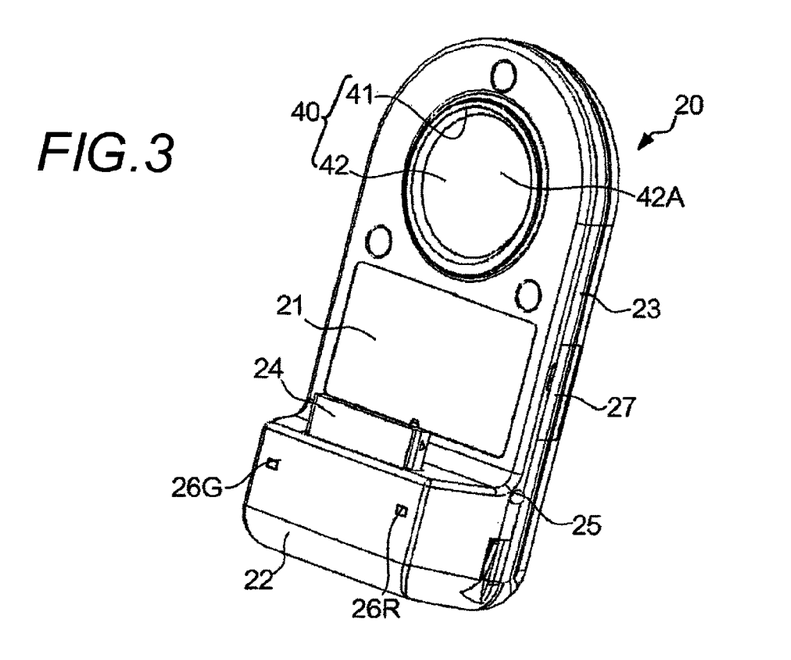
FIG. 3 is a perspective view showing a holder according to the embodiment.
Figure 4:
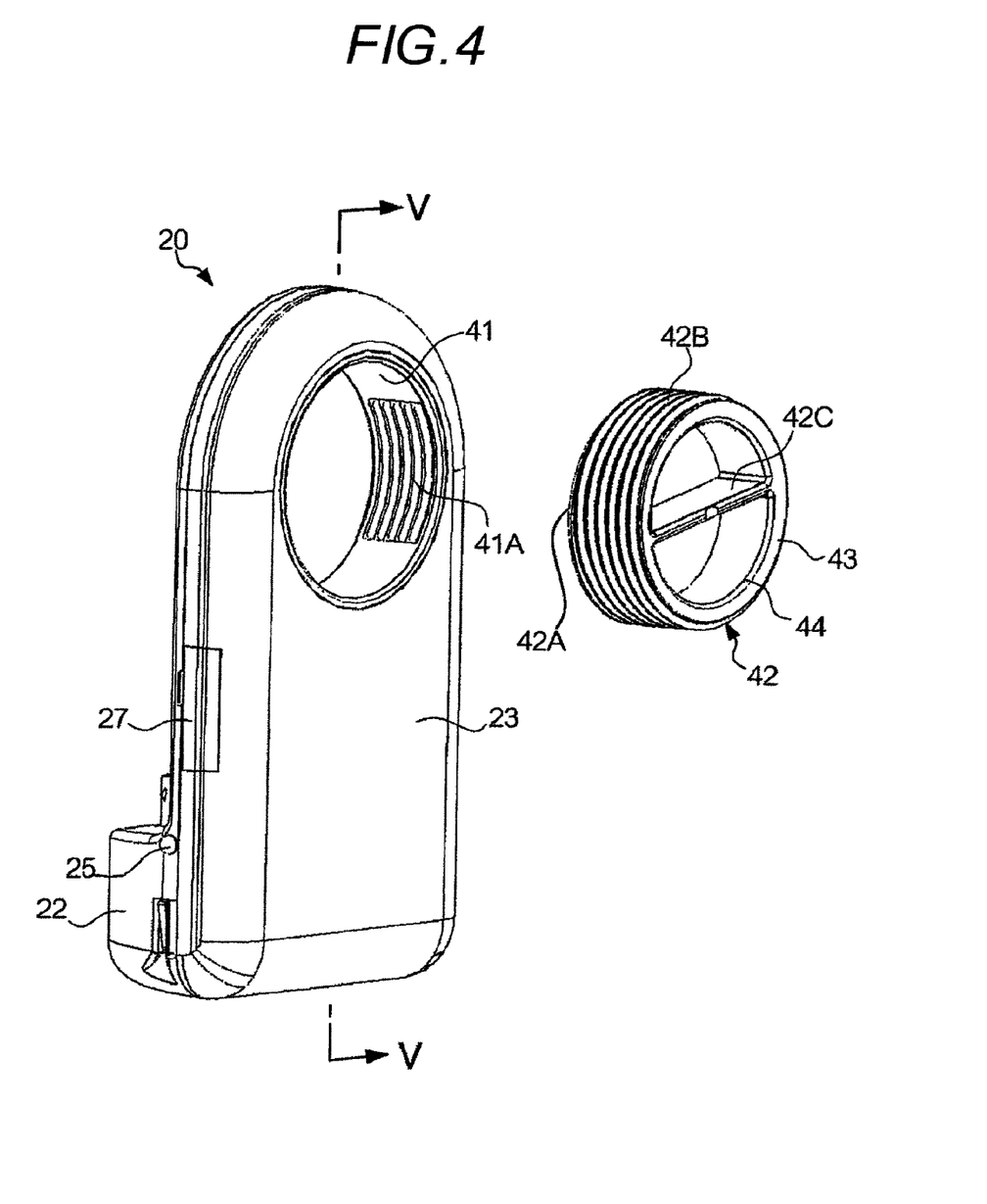
FIG. 4 is a perspective view showing the holder and a press-contact screw according to the embodiment.
Figure 5:
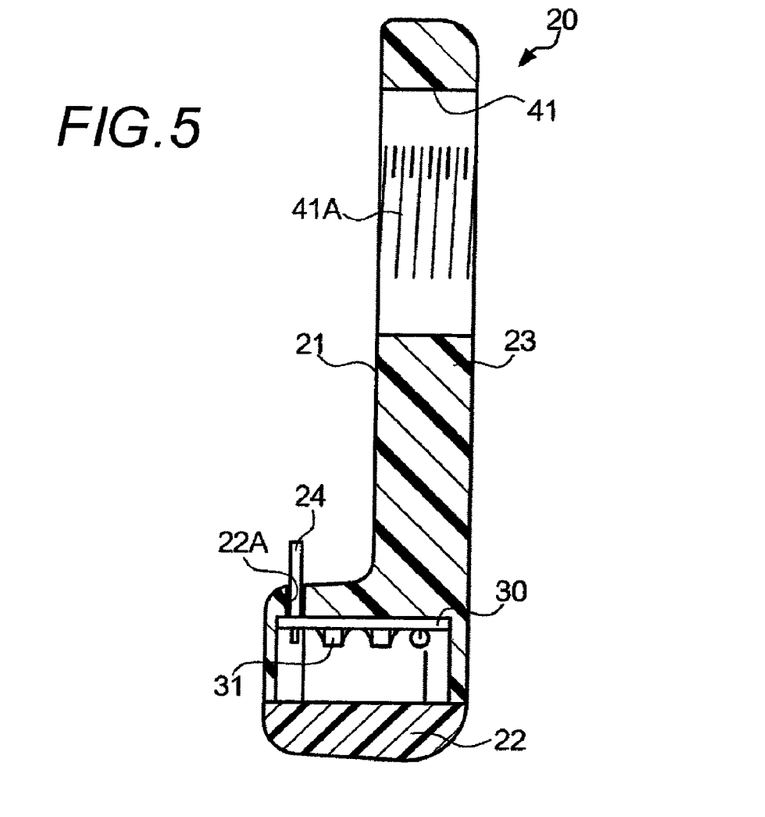
FIG. 5 is a sectional view, viewed from an arrow direction V-V in FIG. 4.

Next, description will be given of a construction of the holder 20. FIG. 3 is a perspective view showing the holder 20, FIG. 4 is a perspective view showing the holder 20 and a press-contact screw 42, and FIG. 5 is a sectional view, viewed from an arrow direction V-V in FIG. 4.

The holder 20 is formed of a resin material (for example, an ABS resin) substantially in the shape of a letter "L," whose shorter side serves as a base portion 22, and whose longer side serves as a back surface portion 23. Inner side of the "L" shape serves as a placing portion 21 to and on which the player 100 is connected and placed. Further, in the holder 20, a positioning mechanism 40 to be described later is provided.

On the base portion 22, a male-type holder-side connector 24 extending in the same direction as the back surface portion 23 is provided. The holder-side connector 24, as shown in FIG. 5, projects toward the placing portion 21 via a connector hole 22A formed in the base portion 22 and mounted on a substrate 30 built in the base portion 22, and thus the holder-side connector 24 is strongly fixed to the base portion 22.

The substrate 30 is mounted with an electronic element 31, and in the present embodiment, a wireless transmission circuit is constituted by the electronic element 31. The wireless transmission circuit transmits data stored in a memory of the player 100 connected via a device-side connector 103 to the holder-side connector 24 to an external apparatus (for example, a loud speaker and the like) by wireless communication. In addition, if there is no external power feeding to the holder 20, the wireless transmission circuit is driven by using electric power of a secondary battery housed in the player 100.

The back surface portion 23, as shown in FIG. 3 and FIG. 4, is formed in a plate shape extending from the base portion 22 in a substantially perpendicular direction. An inner side of the back surface in conjunction with the base portion 22 forms a part of the placing portion 21.

Moreover, at joint parts between the base portion 22 and the back surface portion 23 of the bilateral side surfaces of the holder 20, receiving terminals 25 (only one is shown) to which feeding terminals on the stand 50 are electrically connected are provided in an exposed manner in a state where the stand 50 is attached. A green LED 26G and a red LED 26R connected to the substrate 30 are provided at the front surface of the base portion 22. A concealing cover 27 is formed at a side surface of the back surface portion 23, and a receiving connector to which a connector (neither is shown) to be directly fed with power from a charging adapter via a lead is connected is concealed in the concealing cover 27.

<Construction of Positioning Mechanism 40>

Next, description will be given of the positioning mechanism 40 according to the present embodiment.

The positioning mechanism 40 includes a screw hole 41 opened in the back surface portion 23 and a press-contact screw 42 to be screwed into the screw hole 41. By the positioning mechanism 40, the player 100 is adjusted into a substantially perpendicular state with respect to the base portion 22 in a state where the device-side connector 103 is connected to the holder-side connector 24. Concretely, the player 100 is vertically held with respect to the base portion 22, and then adjusted until a press-contact portion 42A of the press-contact screw 42 is pressed to contact the back surface of the player 100.

Moreover, for the screw hole 41, as shown in FIG. 4, a female screw portion 41A is formed at a part of the inner circumferential surface.

The press-contact screw 42 is formed in a covered cylindrical shape blocked at its tip as the press-contact portion 42A, a male screw portion 42B is formed at its outer circumference, and a diametrically extending handle portion 42C is formed from the press-contact portion 42A toward the start end.

<Construction of Stand 50>

Figure 6:
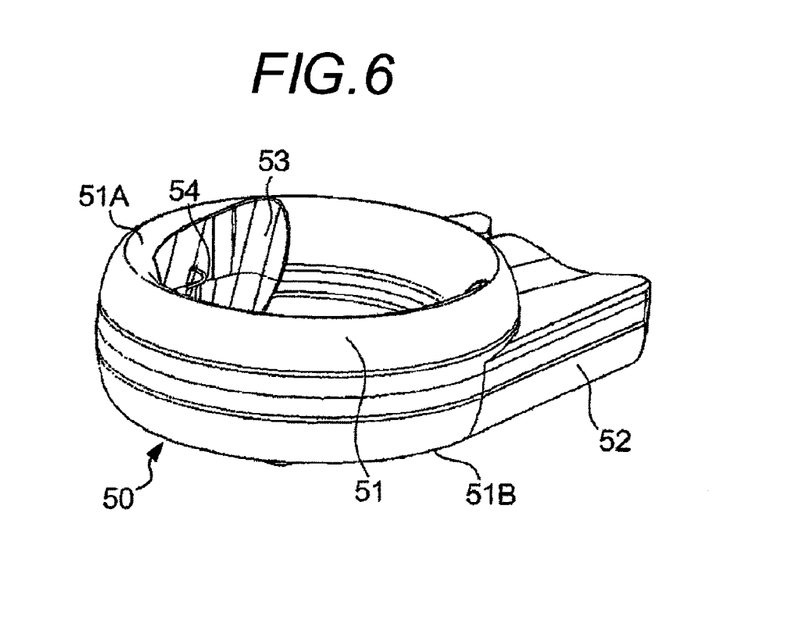
FIG. 6 is a perspective view showing the stand according to the embodiment.

Next, description will be given of a construction of the stand 50 while referring to FIG. 6 and FIG. 7. FIG. 6 is a perspective view of the stand 50, and FIG. 7 is a top view of a state where the stand 50 is attached to the holder 20, viewed from above the player 100.

The stand 50 has an annular stand body 51 and a substantially trapezoidal leg portion 52 projected radially outside the stand body 51. The stand body 51 has end faces apart from each other in the direction vertical to the faces forming annular circles, that is, end faces 51A and 51B at both upper and lower sides, and their diameter has a dimension almost equal to the width dimension of the player 100.

Here, in the stand body 51, for being inserted with a part of the holder 20 from one end face 51A, that is, from the upper side, holder guide grooves 53, 53 (only one is shown) separated from each other in the diametrical direction are formed at its inner circumference obliquely to the axis line of the stand body 51. Further, in the holder guide groove 53, a feeding terminal 54 to be connected to the receiving terminal 25 of the holder 20 in a state where the holder 20 is attached is provided so as to be extendable and retractable at a predetermined spring force.

Figure 7:
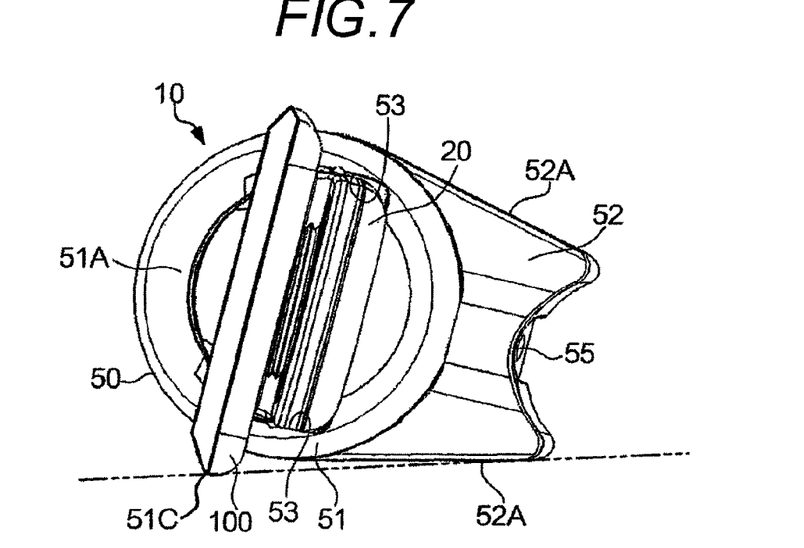
FIG. 7 shows a state where the stand is attached to the holder.

The leg portion 52, as shown in FIG. 7, has side surfaces 52A, 52A in a tapered shape where the width dimension is reduced toward the tip. The side surfaces 52A, 52A are tangential to a side surface 51C of the stand body 51. Further, at an upper base part of the leg portion 52, a female plug 55 to be directly fed with power from a charging adapter via a lead and a male plug (neither is shown) is formed. The female plug 55 is electrically connected to the feeding terminal 54.

For the stand 50, when, as shown in FIG. 1, the player 100 is installed in a vertically mounted state, the other end face 51B (that is, the lower end face 51B) of the stand body 51 serves as a first grounding surface, and when, as shown in FIG. 7, the player 100 is installed in a horizontally mounted state, the side surface 52A of the leg portion 52 and a side surface 51C of the annular portion serve as a second grounding surface.

<Setting Operation of Cradle 10>

Figure 9:
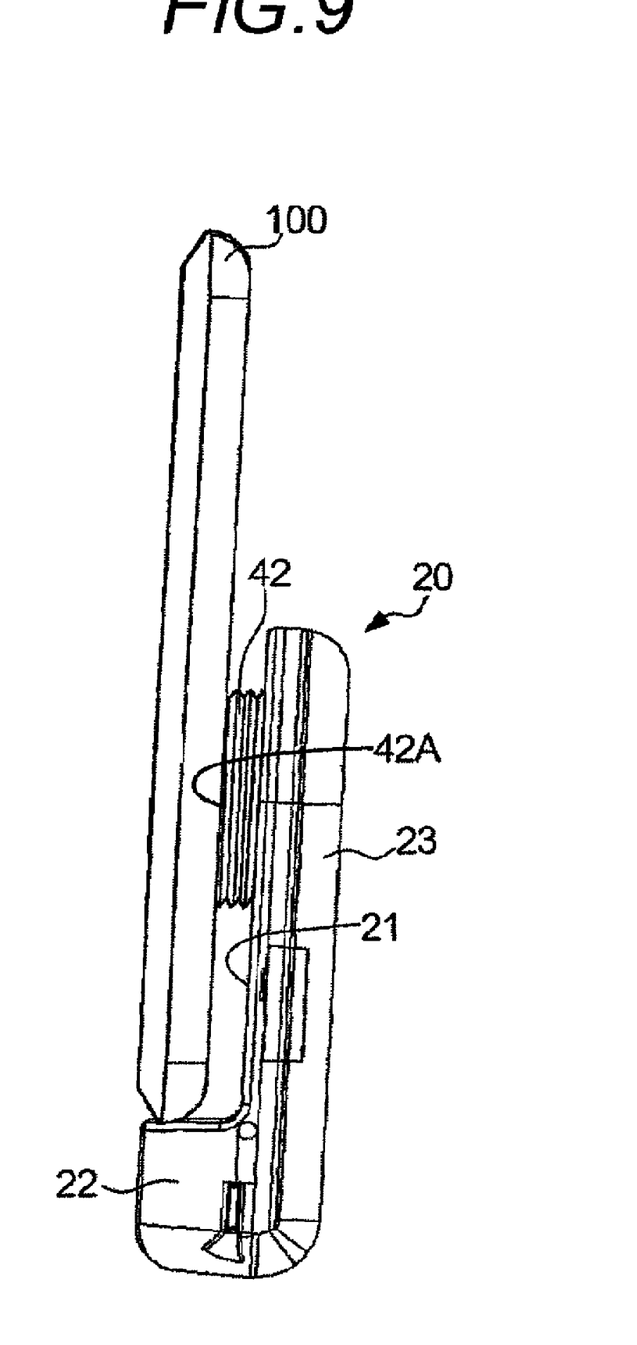
FIG. 9 is a side view showing a state where the portable electronic device is placed on the holder.

Next, description will be given of the operation when the player 100 is placed on the cradle 10 according to the present embodiment while referring to the figures. FIG. 8 schematically shows a dimensional relationship between the holder 20 and the player 100, and FIG. 9 is a side view showing a state where the player 100 is placed on the holder 20 (on the cradle 10).

This setting operation is, as shown in FIG. 8, for screwing the press-contact screw 42 to adjust a distance L so that L≈W, where the distance from the device-side connector 103 of the player 100 to the surface opposing the back surface portion 23 is W, and the distance from the holder-side connector 24 to the press-contact portion 42A is L.

First, a user retracts the press-contact screw 42 to such an extent that the press-contact portion 42A thereof does not project from the back surface portion 23, and connects the device-side connector 103 to the holder-side connector 24 in order to place the player 100 on the placing portion 21 of the holder 20. In this case, the player 100 has not been fixed to the holder 20, and thus results in an unstable state. The user therefore holds the player 100 in a state perpendicular to the base portion 22, and then pinches the handle portion 42C of the press-contact screw 42 and rotates this in the clockwise direction to screw the press-contact screw 42 into the screw hole 41. This makes the press-contact portion 42A of the press-contact screw 42 project from the back surface portion 23 so as to approach the back surface of the player 100. By pressing the press-contact portion 42A of the press-contact screw 42 to contact the back surface of the player 100, the user, as shown in FIG. 9, regulates the press-contact screw 42 to a predetermined position (that is, L≈W) so as to set the player 100 into a positional state perpendicular to the base portion 22.

<Operation of Cradle 10>

As a result of placing the player 100 on the cradle 10 according to the present embodiment, the cradle 10 electrically connects the device-side connector 103 and the holder-side connector 24. As a result, the wireless transmission circuit integrated in the holder 20 is driven by receiving power fed from the secondary battery of the player 100 to transmit data stored in the memory of the player 100 to an external apparatus (for example, a loud speaker and the like) by wireless communication.

In addition, because the wireless transmission circuit may have a function of lighting up the green LED 26G when the transmission is satisfactory and lighting up the red LED 26R when an error has occurred, this informs the user of the state of wireless communications.

Also, when there is external power feeding via the female plug 55 of the stand 50 or external power feeding via a power feeding connector in the concealing cover 27 to the holder 20, the wireless transmission circuit may be driven by the external power feeding. In this case, it suffices to constitute a circuit to determine whether external power feeding exists by the electronic element 31 mounted on the substrate 30. In addition, power feeding sources may be switched over at the user's will.

Moreover, for the cradle 10, the holder 20 attached with the player 100 is placed from above the stand 50. Then, as shown in FIG. 1, by grounding the other end face (underside) 51B of the stand body 51, the player 100 is placed and held in a vertically mounted state. This makes it possible to install the display portion 101 of the player 100 in a vertically long state.

Moreover, because the holder guide groove 53 of the stand 50 is formed in an inclined manner with respect to the axis line of the stand body 51, as shown in FIG. 1, the underside (the other end face 51B) of the stand 50 is grounded, and the upper side of the display portion 101 is installed in a state inclined backward. This makes the display portion 101 easily visible to the user.

On the other hand, when the display portion 101 is installed in a horizontally long state, because, as shown in FIG. 7, the side surface 52A of the leg portion 52 in a tapered shape, the side surface 51C of the annular portion, and further a longitudinal side surface of the player body are grounded, the player 100 is held in a horizontally installed state by an engagement relationship with the stand 50. This makes it possible to install the display portion 101 of the player 100 in a horizontally long state. Further, because the width dimension of the leg portion 52 is reduced toward the tip, the upper side of the display portion 101 is installed in a state inclined backward.

Thus, in the cradle 10 according to the present embodiment, attaching the holder 20 to the stand 50 enables mounting the player 100 vertically and horizontally.

Further, when the player 100 having a function, according to whether the display portion 101 is in a vertically long state or a horizontally long state, of automatically switching over its display to a vertically long display or a horizontally long display is placed on the cradle 10 according to the present embodiment, simply transposing the cradle 10 into a vertically mounted state or a horizontally mounted state makes it possible to switch over the vertically long display and the horizontally long display of the display portion 101.

Moreover, because the stand 50 is in a shape to install and hold a part of the portable electronic device (player 100 (holder 20)) in the annular stand body 51, in comparison to the shape where, as in JP 2006-262326 A, the portable electronic device is grasped from the horizontal direction and the vertical direction, the size can be reduced. Moreover, because the stand 50, which is constituted by the annular stand body 51 and the substantially trapezoidal leg portion 52 formed in a projecting manner radially outside the same, also has a simple structure in terms of design, and can thus also be increased in strength in comparison with the placing base of JP 2006-262326 A.

<Modifications>

Although an embodiment of the present invention has been described in the above, the present invention can be carried out in other various modes without being limited to the above embodiment. For example, the embodiment may be modified as in the following to carry out the present invention.

First Modified Example

In the above-mentioned embodiment, a case where the stand 50 is formed as a part of the cradle 10 has been exemplified, however, the present invention is not limited thereto, and alternatively the portable electronic device (for example, portable music player) may be directly attached to the stand 50.

Figure 10:
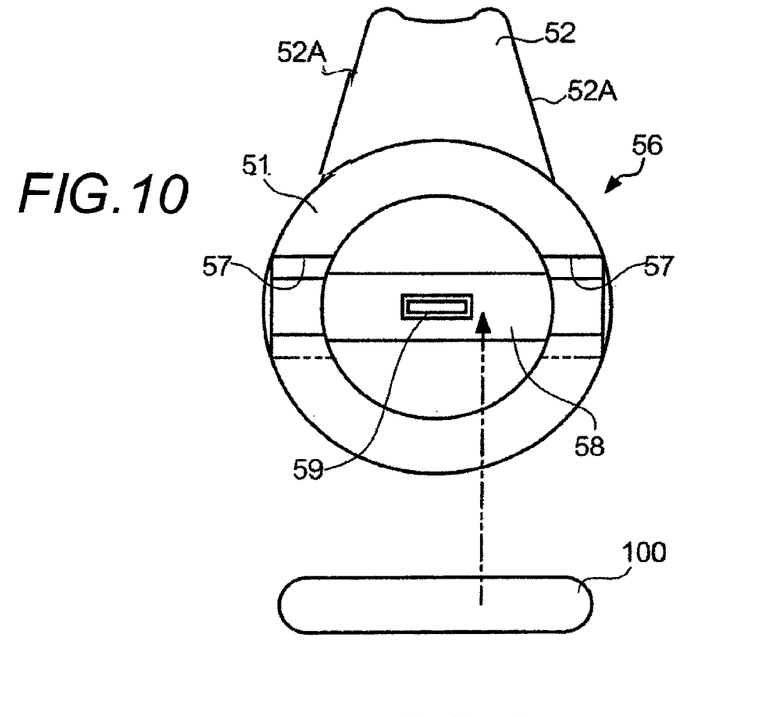
FIG. 10 is a sectional view showing the stand according to a first modified example.

In this case, it suffices to construct a stand like the stand 56 exemplified in FIG. 10.

Although the stand 56 is constructed in almost the same manner as the stand 50 described in the embodiment, the holder guide grooves 53 are, as device guide grooves 57, 57, formed at both radial sides of the stand body 51 in a state inclined with respect to the axis line of the stand body 51. In addition, at the side of an end face to serve as a first grounding surface of the stand body 51, a beam portion 58 extending in the diametrical direction is formed, and on the beam portion 58, a stand-side connector 59 is formed in an obliquely projecting manner so as to be parallel to the inclination of the device guide groove 57. Then, at a stage where the player 100 is attached, the device-side connector 103 is connected to the stand-side connector 59.

Also in the stand 56 constructed as such, grounding the end face 51B of the stand body 51 to serve as the first grounding surface in the same manner as in the stand 50 of the embodiment allows placing the player 100 in a vertically installed state, and grounding the side surface 52A of the leg portion 52 to serve as the second grounding surface allows placing the player 100 in a horizontally mounted state.

Second Modified Example

A positioning unit may be composed of a through-hole, an insertion shaft, and an insertion restricting unit.

Figure 11:
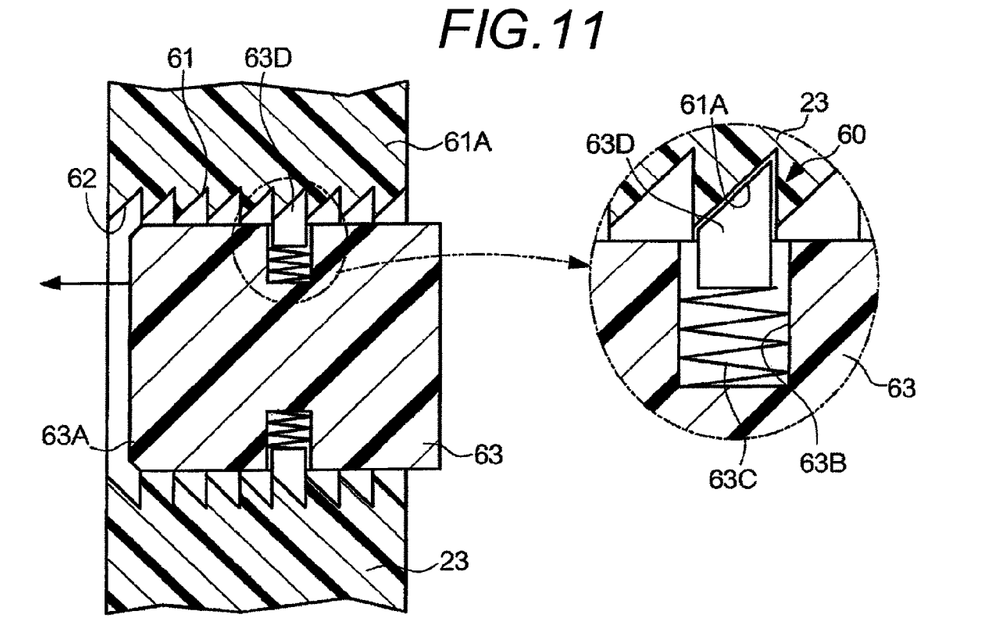
FIG. 11 is a sectional view showing the positioning mechanism according to a second modified example.

Concretely, the positioning unit, like a positioning mechanism 60 shown in FIG. 11, includes a through-hole 62 opened in the back surface portion 23 and provided with an annular groove group 61 of a plurality of annular grooves 61A formed at its inner circumferential surface, and an insertion shaft 63 which is provided with an engagement claw 63D to be inserted in the through-hole 62 and engaged with the annular groove group 61 and whose press-contact portion 63A at its tip is extending toward a surface opposing the back surface portion of the portable electronic device.

The engagement claw 63D is inserted, in each of the housing holes 63B formed at positions opposing in the diametrical direction of the insertion shaft 63 to have rectangular shapes in section opened to the outer circumferential side, along with an urging spring 63C.

The annular groove 61A is formed to have a right-angled triangular sectional shape whose hypotenuse is inclined with respect to the inserting direction (arrow) of the insertion shaft 63, and the engagement claw 63D also has a shape of a tooth form to be engaged with the annular groove 61A.

In the positioning mechanism 60 constructed as such, when the insertion shaft 63 is pressed in the arrow direction, the engagement claw 63D is pushed into the housing hole 63B against the spring force of the urging spring 63C, so that the press-contact portion 63A moves in the arrow direction, and the press-contact portion 63A contacts the back surface of the player 100.

In addition, the engaging portion and to-be-engaged portion of the positioning mechanism 60 may be formed vice versa in terms of the recessed and projected shapes thereof.

Third Modified Example

In the above-mentioned embodiment, the player 100 to be placed on the cradle 10 is limited to a player having an device-side connector 103 that can be connected to the holder-side connector 24, however, making the holder-side connector 24 replaceable makes it also possible to place players having various device-side connectors.

In the above-mentioned embodiment and modifications, description has been given of a portable music player as an example of the portable electronic device, however, the present invention is by no means limited thereto, and the cradle according to the present invention can also be placed with a mobile phone, a digital camera, a PDA (personal digital assistant), or the like, and moreover, common usage beyond the types of portable electronic devices also becomes possible.

What is claimed is:

1. A stand for a portable electronic device, the stand comprising:

an annularly-formed stand body having a first end face and a second end face apart from each other in a direction vertical to a face forming an annular circle of the stand body, the stand body holding therein the portable electronic device to be inserted from a side of the first end face; and a leg portion having side surfaces projected radially outside the stand body so as to reduce the width dimension between the side surfaces, wherein a grounding surface of the stand to be grounded when the stand is mounted is selected from the second end face of the stand body and one of the side surfaces of the leg portion.

2. The stand according to claim 1, wherein a guide groove is formed on an inner surface of the stand body from the first end face toward the second end face to insert a part of the portable electronic device.

3. The stand according to claim 2, wherein the guide groove is inclined with respect to a center axis of the annular circle of the stand body.

4. The stand according to claim 1, wherein the stand body is substantially equal in diameter to a width dimension of the portable electronic device.

5. The stand according to claim 1, wherein a feeding terminal is provided on the stand body to be connected to a receiving terminal of the portable electronic device.

6. The stand according to claim 1, wherein a holder for holding the portable electronic device is detachably provided to the stand body.

7. The stand according to claim 1, wherein the side surfaces of the leg portion are formed in tapered and tangential to a side surface of the stand body.

* * * * *